(12) United States Patent
Itoh

(10) Patent No.: US 6,342,957 B1
(45) Date of Patent: Jan. 29, 2002

(54) IMAGE FORMING APPARATUS

(75) Inventor: Shinji Itoh, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 08/990,137

(22) Filed: Dec. 12, 1997

(30) Foreign Application Priority Data

Dec. 13, 1996 (JP) .............................. 8-333838

(51) Int. Cl.[7] .............................. G03F 3/10; H04N 1/04
(52) U.S. Cl. ...................... 358/527; 358/487; 358/474; 358/448; 358/401
(58) Field of Search .................. 358/527, 506, 358/487, 505, 474, 452, 537, 448, 450, 540, 403, 444, 401, 501; 355/54, 40, 41, 77, 35, 69

(56) References Cited

U.S. PATENT DOCUMENTS

| | | | |
|---|---|---|---|
| 5,101,286 A | * 3/1992 | Patton | 358/487 |
| 5,218,455 A | * 6/1993 | Kristy | 358/403 |
| 5,522,657 A | 6/1996 | Jamzadeh et al. | 358/302 |
| 5,706,050 A | * 1/1998 | Nisimura et al. | 348/97 |
| 5,745,220 A | * 4/1998 | Okazaki et al. | 355/54 |
| 5,784,149 A | * 7/1998 | Kawaoka | 355/35 |

FOREIGN PATENT DOCUMENTS

| | | |
|---|---|---|
| DE | 195 44 178 A1 | 5/1996 |
| EP | 450 552 A2 | 10/1991 |
| EP | 499 719 A1 | 8/1992 |

* cited by examiner

Primary Examiner—Cheukfan Lee

(57) ABSTRACT

An image forming apparatus includes a reader for continuously and photoelectrically reading a plurality of original images and successively making the original images to digital image data. An image processor is further included for subjecting the digital image data to predetermined image processing to create display image data. A display then displays a plurality of the images of the display image data at the same time. An indicator allows selection of arbitrary images from the images displayed on the display and output of the selected arbitrary images as prints. Finally, a recording unit is included for receiving the output digital image data of the original images indicated by the indicator and outputting the output digital image data as the prints. With its arrangement, the image forming apparatus can simply and promptly carry out the job for selecting the necessary frames from one strip and realize high productivity at an excellent working efficiency.

20 Claims, 4 Drawing Sheets

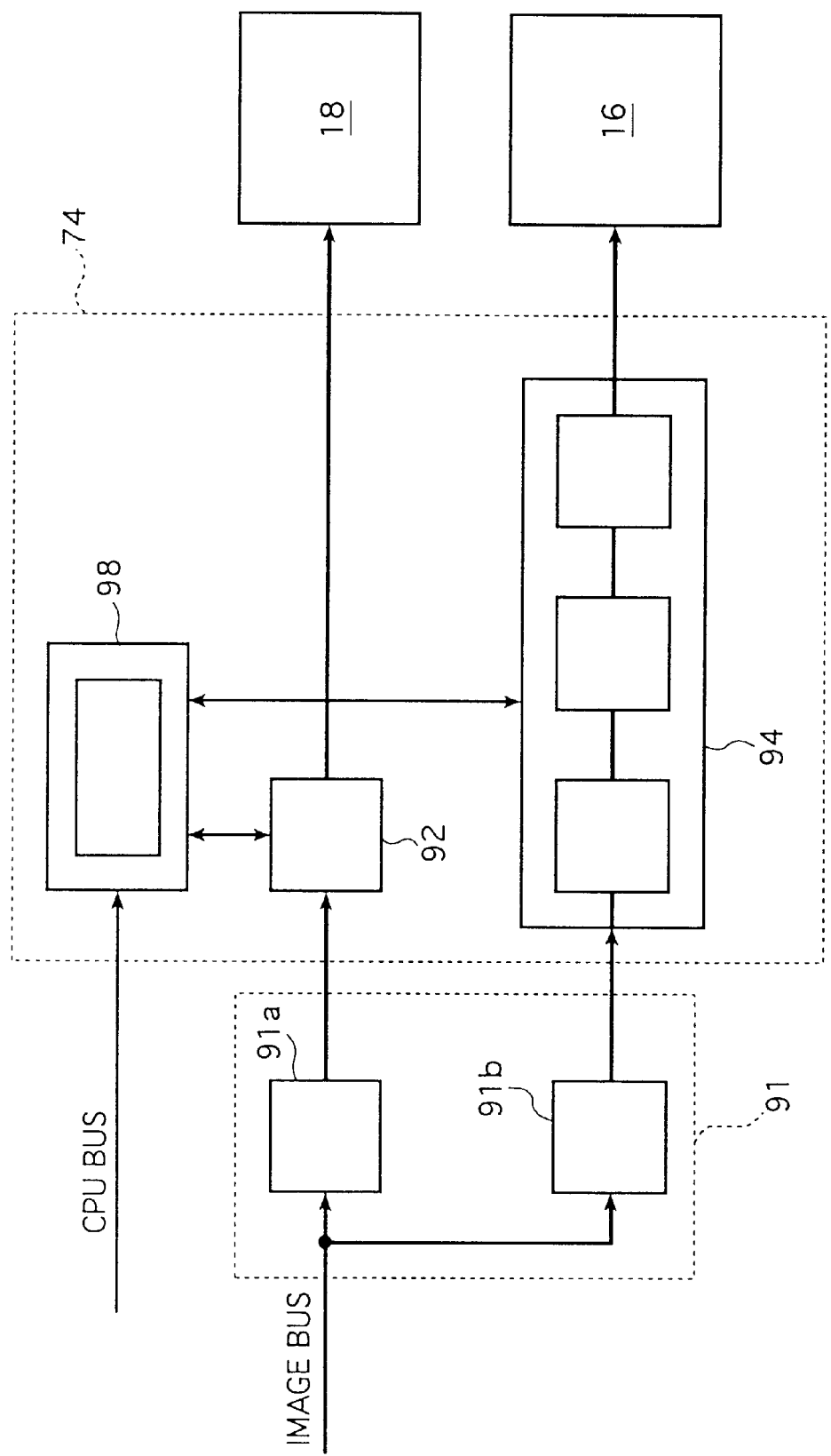

IMAGE FORMING APPARATUS

BACKGROUND OF THE INVENTION

The present invention relates to the technical field of a digital image forming apparatus for obtaining digital image data by photoelectrically reading original images, recording images in accordance with the image data and outputting prints on which the original images are reproduced.

Images recorded on photographic films (hereunder referred to simply as "films") such as negative films, reversal films and the like are conventionally printed onto photographic papers and other light-sensitive materials by so-called direct exposure, that is, a method in which the recorded image of the film is projected onto the light-sensitive material for areal exposure.

In contrast, there have been recently developed digital photoprinters which make use of digital exposure. The apparatus reads photoelectrically the image recorded on a film, converts the read image into a digital signal and thereafter applies various steps of image processing to provide recording image data, records the image (latent image) by scanning and exposing the light-sensitive materials with recording light modulated in accordance with the image data, and produces a print.

In digital photoprinters, exposing conditions are determined by photoelectrically reading a film and subjecting the film to color/density corrections by means of signal processing. Since the operator need not determine the exposing conditions and further adjust a filter, a stop and the like at the time of exposure and the time required for the exposure per one image for the print is short and the exposure time in accordance with the image size is constant, the development can be performed more quickly than in the conventional areal exposure.

Further, it is easy to perform editing jobs such as composition of a plurality of images to a composite image, or division of a single image into segments and procedures of image processing such as color/density adjustments, edge enhancement and the like, and finished prints can be produced after desired editing and image processing has been made in accordance with a specific use. In addition, since the image recorded in the finished print is fundamentally handled as image data, it is not only output as the finished print but also can be supplied to computers and the like. Further, since the image data can be stored in storage media such as floppy disks, this offers the advantage that extra printing and other jobs can be accomplished without any films that serves as the original. In addition, since the exposing conditions need not be determined again, a job can be promptly and simply carried out.

Furthermore, with prints produced by the conventional direct exposure, not all of the image recorded in films and the like can be reproduced in such aspects as resolution and color/density reproducibility. In contrast, digital photoprinters are capable of outputting prints that feature almost complete reproduction of the image (density information) recorded on the films.

The basic components of the digital photoprinter under consideration are a scanner (image reading unit) for photoelectrically reading the image recorded on the film, an image processing (setup) unit that performs image processing operations on the thus read image to determine the exposing conditions for image recording and a printer (image recording unit) that performs development after a light-sensitive material was scanned and exposed in accordance with the determined exposing conditions.

In the scanner, the reading light emitted from a light source is applied to the film so as to obtain projecting light that bears the original image and the projecting light is projected onto an image sensor such as a CCD sensor or the like through an imaging lens and subjected to photoelectrical conversion to read the image. The image is subjected to various steps of image processing as necessary and thereafter supplied to the image processing apparatus as the image data (image data signal) of the film.

The image processing apparatus sets image processing conditions from prescanned image data, applies image processing in accordance with the thus set conditions to main scanned image data and supplies the image data to the printer as output image data (exposing conditions) for recording the image.

When the printer is, for example, a unit making use of scanning and exposure by means of a light beam, it modulates the light beam in accordance with the image data supplied from the image processing apparatus and deflects the light beam in a main scanning direction. In addition, it transports the light-sensitive material in a auxiliary scanning direction which is perpendicular to the main scanning direction to thereby form a latent image by exposing (developing) the light-sensitive material by the light beam bearing the image. Subsequently, it carries out development processing and the like in accordance with the type of the light-sensitive material so that the image recorded on the film is reproduced and made to a finished print (a photograph).

Excellent workability and high productivity resulting therefrom are required for the digital photoprinter.

What is used as the original in the digital photoprinter is, for example, a film referred to as a so-called strip which is mainly composed of an elongated film on which a multiplicity of images (ordinarily, 24 frames or 36 frames) are recorded. Since the strip may include, for example, images which were unsuccessfully recorded, there is a case that all of the images recorded on the strip are not output as finished prints. In particular, when extra prints are made, it is an ordinary practice to select the images of several frames from one strip and output the necessary number of finished prints for each of the frames.

Therefore, in order to realize an effective job, it is required to reduce the operation for reading the unnecessary frames from which the finished prints are not output and simply and promptly execute the selection of the necessary frames (images) from the one strip and the indication and the like of the number of output prints for each of the selected frames.

In a photograph print job, an approval job is carried out by the operator when necessary, that is, in the digital photoprinter, the image data obtained in the prescanning is processed under the set image processing conditions and the thus processed image data is displayed on a display such as a CRT (cathode ray tube) or the like, so that the operator executes the approval job using this displayed image.

Therefore, it is also necessary for the effective job to promptly select only the necessary frames and execute the approval job to them.

SUMMARY OF THE INVENTION

An object of the present invention is to provide a digital image forming apparatus which is preferably applicable to digital photoprinters and the like which photoelectrically read an original image, subject it to predetermined image processing, reproduce the image to a print and output the print, the digital image forming apparatus being capable of simply and promptly executing a job for selecting necessary frames from one strip and an approval job and realizing high productivity at an excellent job efficiency.

To achieve the above object, the present invention provides an image forming apparatus which comprises reading means for continuously and photoelectrically reading a plurality of original images and successively making the original images to digital image data; image processing means for subjecting the digital image data to predetermined image processing to create display image data; a display for displaying a plurality of the images of the display image data at the same time; indication means for indicating to select arbitrary images from the images displayed on the display and output the selected arbitrary images as prints; and a recording unit for receiving the output digital image data of the original images indicated by the indication means and outputting the output digital image data as the prints.

It is preferable that the reading means carries out prescanning for obtaining the display image data and main scanning for obtaining the output digital image data to be supplied to the recording unit in the reading of one original image.

It is preferable that the reading conditions in the reading means and/or the image processing conditions of the image data for obtaining the output digital image data are set from the digital image data for creating the display image data.

It is preferable that the images displayed on the display are images processed in accordance with the image processing conditions of the image data for obtaining the output digital image data and the image forming apparatus further comprises alteration means for altering arbitrary one of the image processing conditions, the reading conditions in the reading means, the number of prints output by the recording unit and the print size of the prints output by the recording unit after the images are displayed.

Further, it is preferable that the main scanning is carried out by automatically and successively transporting to a specified reading position the original images selected and indicated by the indication means after they are displayed on the display.

BRIEF DESCRIPTION OF THE DRAWINGS

FIG. 4 is a block diagram showing an example of the image forming apparatus having the control section shown in FIG. 3.

DETAILED DESCRIPTION OF THE INVENTION

An image forming apparatus of the present invention will be described below in detail based on a preferred embodiment shown in accompanying drawings.

Figure 1:
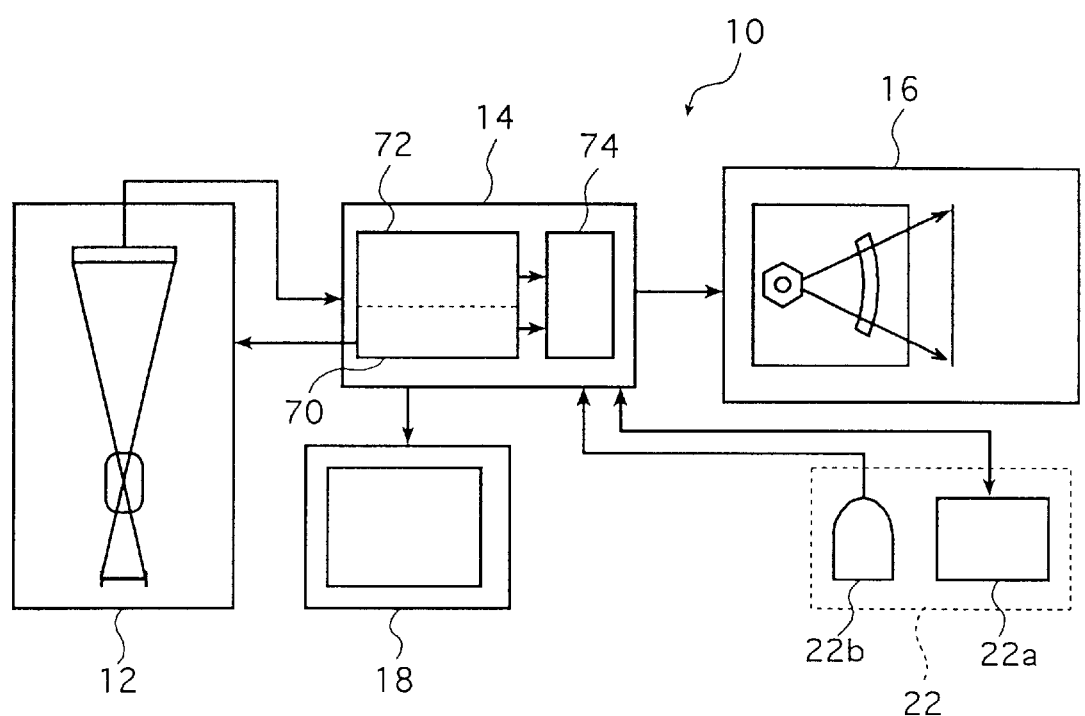
FIG. 1 is a block diagram showing an example of an image forming apparatus of the present invention.

FIG. 1 shows a block diagram showing an example of the image forming apparatus of the present invention.

The image forming apparatus 10 as the aforesaid digital photoprinter shown in FIG. 1 fundamentally comprises a scanner (image reading unit) 12 for photoelectrically reading an original image, a control section 14 for subjecting the thus read image data (image information) to image processing and automatically setting of image processing conditions (automatic setup), and further executing the operation, control and the like of the image forming apparatus 10 as a whole, and a printer (image recording unit) 16 for exposing the image onto a light-sensitive material by a light beam modulated in accordance with the image data processed by the control section 14 and performing development processing on the exposed light-sensitive material to output it as a finished print.

Connected to the control section 14 are an operation system 22 having a keyboard 22a and a mouse 22b for setting various conditions, selecting and indicating frames to be output, and inputting the adjustments and the like of color/density and gradation, and a display 18 for displaying images read by the scanner, various indications and operations, setting of various conditions/registered images and the like. The operator carries out the various indications and operations by, for example, a GUI (graphic user interface) using the display 18 and the operation system 22.

Figure 2:
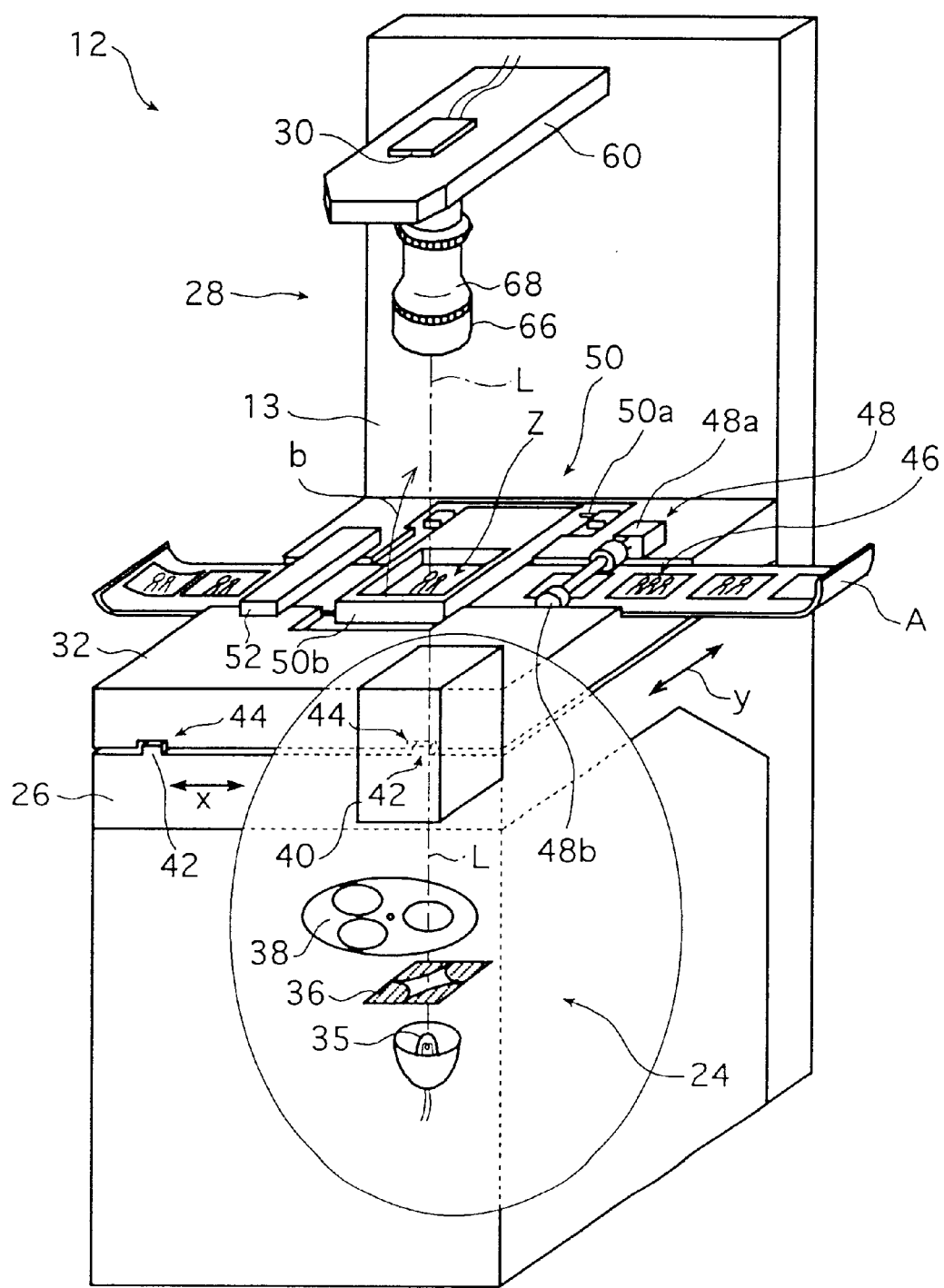
FIG. 2 is a schematic view showing an example of a scanner of the image forming apparatus shown in FIG. 1.

FIG. 2 shows a schematic view of the scanner 12.

The scanner 12 is a unit for photoelectrically reading the images recorded on a film as an original such as a strip A composed of an elongated film (usually, a negative film) having images recorded thereon in a multiplicity of the frames thereof, slides each composed of one frame of a film (usually, a reversal film) held by a frame member (mount), and the like. The scanner 12 fundamentally includes an optical frame 13, a light source section 24, a carrier base 26, an imaging section 28, an image sensor 30 as an area sensor and various carriers such as a film carrier 32 and the like which are alternately replaceably mounted on the carrier base 26.

In the scanner 12, the film is transported in the direction of arrow x in the figure by the film carrier 32 and the like mounted on the carrier base 26. The respective frames are successively stopped at a reading position Z. Light is then irradiated from the light source section 24 to the film to thereby obtain projecting light which bears the images recorded on the film. The projecting light is then projected to the image sensor 30 at the imaging section 28 and is subjected to photoelectrical conversion by the image sensor 30 so as to obtain an image signal. Thus, the images recorded on the film are two-dimensionally read as image data. The scanner 12 is controlled by the controller 70 of the control section 14 which will be described later.

The light source section 24 forms reading light for permitting the image sensor 30 to read the image recorded on the film by separating the image into the three primary colors R (red), G (green) and B (blue) and irradiates the reading light from below the film. The light source section 24 is located below the carrier base 26 of the optical frame 13 and includes a light source 35, a variable aperture stop 36, a color filter plate 38 and a diffusion box 40.

Various known light sources, for example, a halogen lamp, a xenon lamp, a mercury-vapor lamp, etc. which can irradiate reading light in a quantity which is sufficient for the image sensor 30 to read images may be used as the light source 35.

The variable stop 36 which adjusts the quantity of light from the light source 35 is composed of two ND filters in the illustrated example. Each of the filters has a logarithmic curve drawn to the shading portion thereof and a different quantity of light which passes therethrough in the direction perpendicular to an optical axis L. The filters adjust the quantity of light irradiated from the light source 35 to the film by coming closer to or depart from each other in the direction perpendicular to the optical axis L.

The color filter plate 38 is composed of three color filters, that is, a red (R) filter, a green (G) filter and a blue (B) filter which are mounted on a disc-shaped member. In an image reading mode, the color filter which acts on the optical axis L is changed by turning the disc-shaped member about the axial center thereof so that the respective filters are successively inserted into the light path L and reading light is applied to the film by being adjusted, by which the image recorded on the film is separated into the three primary colors R, G and B.

The diffusion box 40 diffuses the reading light which was irradiated from the light source 35 and passed through the color filters with the quantity thereof adjusted by the variable stop 36 so as to make the quantity and other features of the reading light incident on the film uniform over the film surface perpendicular to the optical axis L.

The carrier base 26 is disposed above the light source section 24, provides a site for holding the carriers such as the film carrier 32 and the like by placing them on the top surface thereof and is secured perpendicular to the optical frame 13. The carrier base 26 has an opening (not shown) formed in an area corresponding to the optical axis L to cause the light from the light source section 24 to pass therethrough. Note, the opening is set so that the light from the light source section 24 is sufficiently irradiated on the entire surface of the maximum image plane size of the film which can be read by the image sensor 30.

Guide rails 42 are formed on the top surface of the carrier base 26 in a direction away from the operator toward the optical frame 13 in the figure, namely, in the direction of arrow y which is perpendicular to the direction of arrow x which is the transport direction of the strip A or the like. Grooves 44 are formed on the bottom surfaces of the carriers such as the film carrier 32 and the like so that they are engaged with the guide rails 42. The positions of the film carrier 32 and the like are restricted in the directions of arrows x and y in such a manner that they are fixed by being pushed in the direction of arrow y until the inner end surfaces thereof are abutted against the optical frame 13 with the grooves 44, 44 thereof engaged with the guide rails 42 of the carrier base 26.

These carriers can be very easily replaced by pulling them toward the operator in the figure and extracting their grooves 44 from the guide rails 42. Note, the device for mounting the film carrier 32 and the like at the specified positions on the carrier base 26 is not particularly limited.

The film carrier 32 transports the elongated film, that is, the so-called strip (sleeve) A on which the multiplicity of images are recorded, in the lengthwise direction thereof to thereby successively transport the respective images recorded on the strip A to a specified position on the optical axis L. That is, the images on the strip are transported to the reading position Z corresponding to the opening of the carrier base 26, for subsequent reading.

Formed on the top surface of the film carrier 32 is a guide groove 46 which extends between both the ends of the film carrier 32 in the transport direction shown by arrow x and in an area intersecting the optical axis L. The guide groove 46 has approximately the same width as that of the strip A. The strip A is transported with the lengthwise direction thereof coincided with the x-direction in the state that it is inserted into the guide groove 46. The respective images are successively transported to the reading position Z on the optical axis L. To this end, the depth of the guide groove 46 is set such that the image plane (that is, the emulsion surface) of the strip A is located at a specified position along the optical axis L (in the direction of focal depth).

An opening is formed at the reading position Z of the film carrier 32 to permit the light from the light source section 24 to pass therethrough. The opening acts as a mask for determining the image size of the film which is read by the image sensor 30 in the scanner 12. The shape and size of the opening, that is, the size of the mask is set so as to be inscribed to the image plane size of the strip A of, for example, 135 size and the like which is placed on the film carrier 32 at most in accordance with the image plane size of the strip A.

Note, it may be also possible that the opening formed to the film carrier 32 is set to a size corresponding to the opening of the carrier base 26 and masks corresponding to various sizes of films are replaced and mounted on the film carrier 32.

The guide groove 46 are fitted with a transport device 48 for the strip A, a film compressing unit 50 and an image plane detecting sensor 52 which are arranged this order in the transport direction x.

The transport device 48 is composed of a motor 48a and transport rollers 48b for intermittently transporting the strip A in the direction of arrow x. The transport device 48 stops transporting the strip A when it detects the arrival of a frame of the strip A at the reading position Z by means of the image plane detecting sensor 52 for detecting a recorded image and a DX code. It resumes the transport of the strip A when it receives a READ END signal from the control section 14 to thereby transport a next frame to the reading position Z.

The film compressing unit 50 compresses and releases the strip A by pivoting a compressing member 50b, which has an opening for causing the projecting light of the strips A to pass through, about a pivot shaft 50a. In the reading mode, the film compressing unit 50 compresses a frame located at the reading position Z onto the guide groove 46 to thereby hold an entire image surface at a specified position in the direction of the optical axis L by eliminating the curling and other habits of the strip A.

Various carriers may be used as the carriers used in the image forming apparatus 10 of the present invention in addition to the film carrier 32 so long as they have an opening formed at a reading position for permitting the light from the light source section 24 to pass therethrough and grooves formed thereto for the engagement with the guide rails 42. For example, a carrier corresponding to the carriage of a new photograph system, a slide carrier for successively transporting slides supplied by the operator to a reading position, a manual carrier by which the operator fixes a film at a specified position, a trimming carrier by which the operator disposes a film at an arbitrary position for reading, and the like may be used.

Further, it is preferable that the carrier for setting the film at the reading position is arranged as a replaceable carrier so that it corresponds to the film each time the type, model, size and the like thereof is changed and that the scanner 12 (the control section 14) can discriminate the size and the like of the film by the carrier being mounted.

The imaging section 28 for projecting the projecting light of the strip A or the like to the image sensor 30 is disposed to the upper portion of the optical frame 13.

The imaging section 28 is a lens unit including a zoom lens unit 66 for enlarging and reducing the projecting light by a known zoom mechanism and a focus adjustment lens unit 68 for adjusting a focus by known means and vertically disposed on a surface plate 60 fixed to the optical frame 13.

In ordinary reading, the zoom lens unit 66 changes an optical magnification in accordance with the size of a film as an original, for example, when the film is the strip A of 135 size, in accordance with the size of the strip A and projects the projecting light to the image sensor 30 by adjusting the size of the projecting light to a maximum size which can be projected onto the image sensor 30 (that is, to the size for permitting a necessary image region to inscribe the light receiving plane of the image sensor 30). Note, the size of the film F may be automatically detected by mounting the aforesaid carrier or input by the operator. On the other hand, when so-called trimming for cutting out an arbitrary position of the image recorded on a film and reproducing it to a finished print is carried out, the projecting light can be projected onto the image sensor 30 by being enlarged to an arbitrary magnification of, for example, 0.4 to 0.8 by the operation through the operation system 22 and the like.

On the other hand, the focus adjustment lens unit 68 carries out automatic focusing (AF) when necessary by means of a TTL (through the lens) system using the contrast of an image read by the image sensor 30.

The projecting light of the strip A or the like is projected onto the image sensor 30 by the imaging section 28, photoelectrically read by it and supplied to the control section 14. A shutter used to correct a dark current may be interposed between the imaging section 28 and the image sensor 30.

In the scanner 12 for two-dimensionally reading an image, the image sensor 30 is an area sensor such as, for example, a CCD sensor having 1380×920 pixels. Further, in the apparatus of the illustrated example, the image sensor 30 is movable in the x-direction and the y-direction by an amount corresponding to one half a pixel, by which the number of reading pixels can be apparently increased up to four times.

The scanner 12 reads the image recorded to one frame of the film such as the strip A or the like by separating the image into the three primary colors R, G, and B in such a manner to read the image three times by successively inserting the three R, G, B filters of the color filter plate 38.

In the apparatus of the illustrated example, prescanning for reading the image at low resolution is carried out to determine the stop value of the variable stop 36 and set image processing conditions prior to main scanning for obtaining image data to be output to the printer 16. That is, the scanner 12 reads the image of one frame (outputs image data) six times in total.

In the image forming apparatus 10 according to the present invention, when a plurality of images of an original, preferably a plurality of images of one group are read, that is, when a plurality of images of a strip are read in the case, for example, that the original is the strip A or when a plurality of images of a slide group including a plurality of frames whose prints are requested from a customer in one lot are read in the case, for example, that the original is slides, all the frames of the one group are previously prescanned and displayed on the display 18 so as to select, indicate, and approve the frames to be output as well as effect color/density adjustment and the like when necessary and thereafter the main scanning is carried out only to the necessary frames and the image data thereof is output. This point will be described later in detail.

As described above, the image data read by the scanner 12 is output to the control section 14.

As shown in FIG. 1, the control section 14 includes the controller 70 for controlling the image forming apparatus 10 as a whole, a signal processing unit 72 for receiving the output signal (image data) from the image sensor 30 of the scanner 12 and subjecting the output signal to predetermined signal processing and an image processing unit 74 for subjecting the thus obtained image data to necessary image processing and outputting it as image data which is output by the printer 16 and displayed on the display 18.

Figure 3:
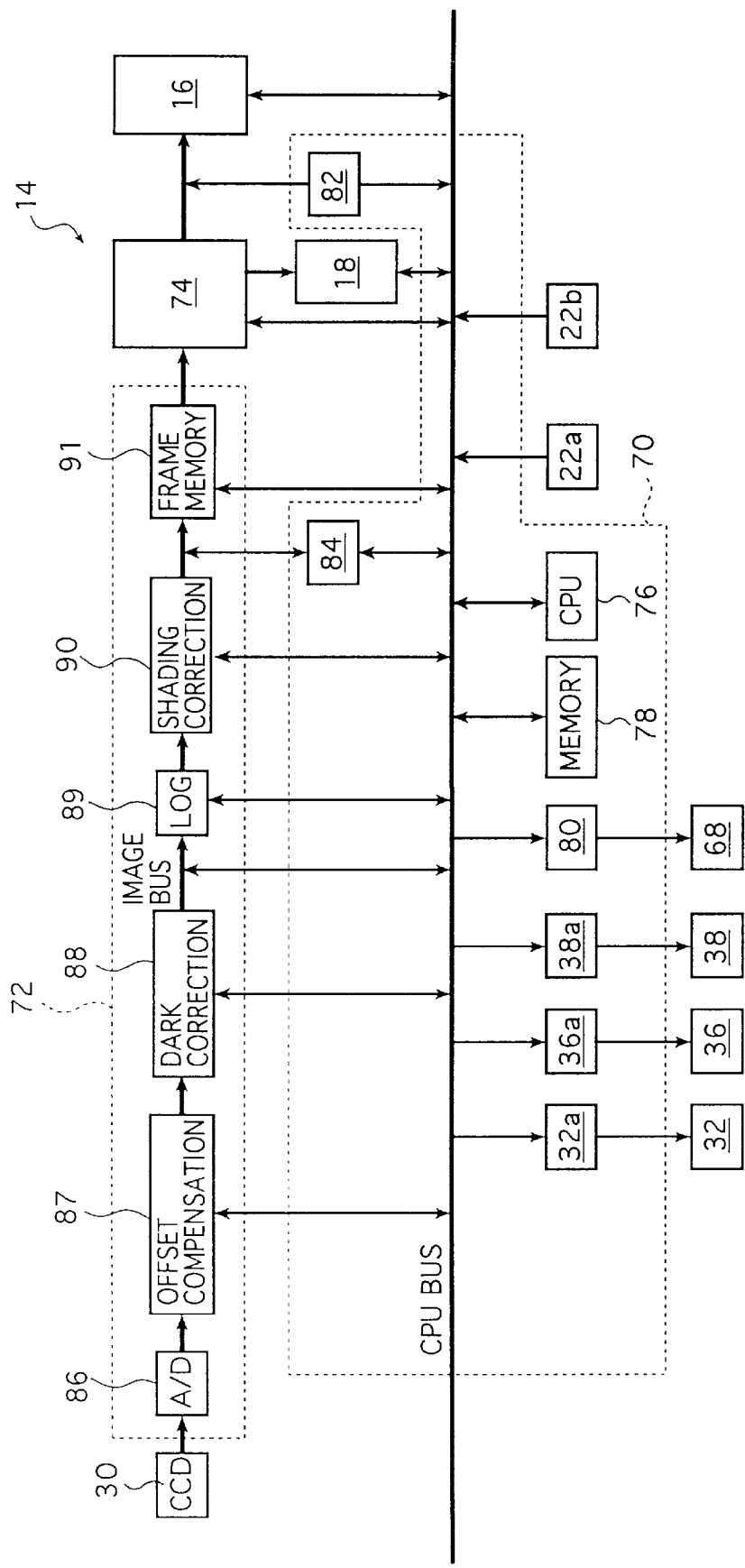
FIG. 3 is a block diagram showing an example of a control section of the image forming apparatus shown in FIG. 1.

FIG. 3 shows a block diagram of the controller 70 and the signal processing unit 72.

The controller 70 includes a CPU 76, a memory 78, automatic focusing device 80, an image turning device 82, a positive/negative converter 84, the controller 32a of the film carrier 32, stop value determination device 36a for determining the stop value of the variable stop 36, and the turning controller 38a of the color filter plate 38, and the like.

The keyboard 22a and the mouse 22b for indicating the operation of the image forming apparatus 10 and inputting data and the display 18 which were described above are connected to the controller 70.

The CPU 76 controls the signal processing calculation effected by the signal processing unit 72, controls and manages the image forming apparatus 10 as a whole including the scanner 12 and the printer 16 and controls various operations such as the registration of a print size and the like which will be described later.

Further, the CPU 76 is provided with recording pixel region determination device for calculating an input pixel region (the number of pixels), an output image region (the number of pixels), an electronic magnification, a pixel region to be cut out, and the like from the various types of data stored in the memory 78 such as a film effective reading region, the output pixel density in the printer 16, defective input pixels and the USM (unsharpness mask) in the image processing, the size of finished prints and the like and further determining a recording pixel region (the number of pixels) which is output to the printer 16 using them.

The memory 78 stores various types of information which are necessary to operate and variously control the image forming apparatus 10 of the present invention such as finished print sizes; carrier information such as data for discriminating the carriers mounted on the scanner 12 and types of films set to the carriers, and the like; the adjustment information of the imaging section 28 in accordance with film sizes and the like; image sensor information such as the sizes of the image sensor 30 (size information in the main and auxiliary scanning directions), pixel density, effective pixel region (number) and the like; the output pixel density of the printer 16; magazine information such as data for discriminating magazines loaded on the printer 16 and the sizes (widths), types and the like of the light-sensitive material Z accommodated in the magazines; an amount of output eclipse margin in consideration of the meandering of the light-sensitive material in the transport unit of the printer 16 and the main scanning length error caused by a light beam scanning unit; and information as to the defective output pixels caused by the image processing effected by the LPF (low-pass filter), the USM and the like of the image processing unit 74.

The image turning device 82 converts the lengthwise direction and the crosswise direction of the image to be read depending upon the size of the light-sensitive material Z loaded on the printer 16, the specification of a finished print indicated by the operator and whether the main scanning is carried out by printer 16 to be described later in the lengthwise direction or the crosswise direction. That is, it is determined whether the image must be turned 90 degrees or not, and when it is necessary to turn the image, the image is turned by rearranging pixels.

The controller 70 is provided with the positive/negative converter 84 for subjecting the image data having been subjected to the predetermined processing by the signal processing unit 72 to positive/negative conversion.

When the original is a reversal film, the positive/negative converter 84 fundamentally converts the image data having been subjected to the predetermined image processing and outputs it as a negative image. A conversion method from a positive state to a negative state and vice versa is not particularly limited and any known conversion method (image processing method) may be employed.

The controller 32a of the film carrier 32, the stop value determination means 36a and the turning controller 38a are connected to the CPU 76 and the image processing unit 74 through a CPU bus.

The controller 32a of the film carrier 32 controls the transport and the like of the strip A carried out by the film carrier 32 and the stop value determination device 36a determines the stop value of the variable stop 36 of the scanner 12 in the main scanning of the respective frames from the image data of the prescanning to be described later. Likewise, the turning controller 38a connected to the CPU 76 and the like controls the turning of the color filter plate 38 of the scanner 12 (the color filter to be inserted) in the prescanning and the main scanning.

The control section 14 inputs the image data (analog image data) output from the scanner 12 to the signal processing unit 72.

In the signal processing unit 72, the image data is converted into digital image data by an A/D converter 86, the DC offset thereof is compensated by an offset compensation circuit 87 and then the resulting digital image data is subjected to dark correction by a dark correction circuit 88. Thereafter, the digital image data is made to input image data by being subjected to logarithmic transformation by a logarithmic transformation circuit 89 and to shading correction by a shading correction circuit 90 and is then stored to a frame memory 91 and supplied to the image processing unit 74.

Note, when automatic focusing is carried out as necessary, the image data subjected to the dark correction by the dark correction circuit 88 is also input to the automatic focusing device 80 of the controller 70.

The automatic focusing device 80 determines a position where the integrated value of image contrast is maximized as a focal point by repeating such an operation that it first moves a focal position to the respective points at predetermined intervals in a predetermined search area by controlling the focus adjustment mechanism of the focus adjustment lens unit 68 of the imaging section 28, obtains the image data subjected to the dark correction at the respective points by the TTL system and determines the integrated value of image contrast. Then, the automatic focusing device 80 correctly sets the imaging section 28 at the focal point through the CPU bus.

As described above, the image forming apparatus 10 of the present invention carries out the prescanning for roughly reading the original image for the setting of image processing conditions and the like prior to the main scanning in which the original image is read at high resolution to output the image.

In correspondence to the above operation, the frame memory 91 which stores the image data from the signal processing unit 72 includes a prescan (frame) memory 91a for storing prescanned image data and a main scan (frame) memory 91b for storing the main scanned image data as shown in FIG. 4.

In the image forming apparatus of the present invention, a plurality of frames, for example, all the images recorded on the one strip A are previously prescanned and thereafter the main scanning is carried out as described above. As a result, the prescan memory 91a is a memory capable of storing a plurality of prescaned images and has a capacity for storing, for example, 36 frames of images recorded on the strip A of 135 size.

As shown in FIG. 4, the image processing unit 74 is composed of a display image processing circuit 92, a recording image processing circuit 94 and a CPU 98 constituting image processing condition setting device and the like.

The recording image processing circuit 94 provides (output) image data which corresponds to an image recorded (exposed) by the printer 16, by cutting out the image signal of the pixels in the cut-out pixel region determined by the CPU 76 of the controller 70, from the main scanned image data stored in the main scan memory 91b and by carrying out various types of image processing for outputting properly finished print, the various types of image processing including, for example, gradation processing, color/density correction, LPF processing for applying a dodging effect (expansion/compression of an image dynamic range), enlargement/reduction processing of the image in accordance with an electronic magnification determined by the CPU 76 (electronic variable power processing), USM processing for making the image vivid, and the like.

The CPU 98 determines the image processing conditions in the recording image processing circuit 94 and the display image processing circuit 92 for the respective frames from the prescanned image data of the respective frames stored in the prescan memory 91a and corrects the thus determined image processing conditions in accordance with a main subject set as necessary and the color/density adjustment and the gradation adjustment effected by the operator. Therefore, in the illustrated example, the image processing conditions in the display image processing circuit 92 which will be described later are suitably adjusted by the adjustment effected by the operator and the image displayed on the display 18 is also changed accordingly as a preferable fashion.

The display image processing circuit 92 subjects the prescanned image data of the respective frames which is stored in the prescan memory 91a to the image processing in accordance with the image processing conditions determined by the CPU 98 and displays the image on the display 18 as the display image data to be displayed on the display 18.

Note, since the processing applied to the prescanned image data by the display image processing circuit 92 is fundamentally the same as the image processing applied to the main scanned image data by the recording image processing circuit 94, the image displayed on the display 18 corresponds to the image of a finished print.

The display image processing circuit 92 applies the predetermined image processing to the image data stored in the prescan memory 91a. Further, it thins the electronic variable power and the image data as necessary to thereby allocate the respective frames to the display screen of the display 18 (bitmap extension). Thus, the images of a plurality of frames, for example, when the original is the strip A having 24 frames, are simultaneously displayed on the display 18. Further, it is preferable to display frame numbers together with the images.

The operator selects the frames to be output by means of the mouse 22b or the like while observing the displayed images of the respective frames and sets a main subject, effects approval and adjusts gradation and color/density when necessary and indicates to output the selected frame. This operation permits the main scanning to be started and only the images of the frames whose output is indicated are read by the indication of the CPU 76. The job for the approval and the like and the job for selecting the frames to be output may be carried out in a reverse order.

In the image forming apparatus 10 of the present invention, the display image processing circuit 92 and the like are not limited to the arrangement for displaying all the images of the one strip A or the like on the display 18 at one time as an image group, but they may be arranged to display a suitable number of the images in the image group such as, for example, one half or one third of the images in accordance with the number of the frames in the image group, a display size and the quality and size of the images to be displayed, and the like. They may further enable the operator to confirm the images of all the frames by the scroll of the screen.

It is preferable to constitute the display image processing circuit 92 and the like to display the images of the selected frames in an enlarged fashion when necessary to improve the workability of the approval and the setting of the main subject.

Although the images processed in accordance with the image processing conditions determined by the CPU 98 are display on the display 18 as a preferable fashion in the illustrated example, the present invention is not limited thereto and the display image processing circuit 92 may allocate and display the image data stored in the prescan memory 91a as it is.

The printer 16 is a known printer using light beam scanning which is composed of a light beam scanning unit, a light-sensitive material transport unit, a development unit and the like. The printer 16 receives the image data from the control section 14 (the recording image processing circuit 94); deflects the light beams which correspond to the respective ones of the exposed light of R, G and B modulated in accordance with the image data in a main scanning direction by means of the light beam scanning unit; draws out an elongated roll-like-wound light-sensitive material from a magazine by means of the transport unit and transports it in a auxiliary scanning direction perpendicular to the main scanning direction to thereby scan and expose the light-sensitive material by the light beams two-dimensionally and form a latent image thereon; subjects the thus exposed light-sensitive material to predetermined development processing such as color development, bleaching and fixing, washing and the like in the development unit; dries the light-sensitive material; cuts it to the respective frames and outputs the cut light-sensitive materials as finished prints.

Although the image forming apparatus 10 of the present invention is fundamentally arranged as described above, it will be described below in more detail through the description of its operation.

When the finished prints are made, the operator mounts a carrier in accordance with a film as an original, for example, the film carrier 32 when the original is the strip A, at the specified position of the carrier base 26 of the scanner 12 and inputs necessary information such as the print size of the finished prints and the like using the mouse 22b or the like. Based on the information, the CPU 76 of the control section 14 reads out various types of necessary information from the memory 78, sets the magnification of the imaging section 28 and calculates the electronic variable power and the like.

The operator confirms that the image forming apparatus 10 is in a predetermined set-up state as to the quantity of light of the light source 35 of the scanner 12, and the like and thereafter loads the strip A on the film carrier 32 in a predetermined state, by which the film carrier 32 transports and stops the first frame of the strip A to and at the reading position Z.

When the operator confirms that the first frame was transported to the reading position Z and instructs to start reading, the scanner 12 starts the prescanning.

When the prescanning is started, the reading light emitted from the light source 35 is adjusted by the filter of the color filter plate 38 inserted into the light path L, for example, the G filter with the amount thereof adjusted by the variable stop 36 and enters and passes through the strip A and projecting light bearing the image (G image) recorded on the first frame of the strip A is obtained. The projecting light is projected onto the effective pixel region of the image sensor 30 at a predetermined optical magnification by the imaging section 28.

With this operation, the G image of the strip A is read, supplied to the control section 14 and subjected to the predetermined signal processing by the signal processing unit 72 and thereafter stored to the prescan memory 91a of the frame memory 91. Upon the completion of the reading of the G image by the image sensor 30, a B image and a R image, for example, are successively read and stored to the prescan memory 91a likewise, by which the prescanning of the first frame is finished.

The image forming apparatus 10 previously prescans a plurality of images, that is, all the images recorded to the frames of the strip A in the illustrated example.

Therefore, when the prescanning of the first frame is finished, the film carrier 32 (transport device 48) transports the strip A by one frame and positions the second frame of the strip A at the reading position Z, so that the prescanning for the second frame is carried out likewise and the image data obtained by the prescanning is stored in the prescan memory 91a likewise. Then the film carrier 32 transports the third frame to the reading position Z and thereafter the similar operations are repeated until the prescanning for a final frame, for example, the 24th frame is carried out likewise.

In the control section 14, the CPU 98 of the image processing unit 74 successively determines the image processing conditions of the respective frames from the prescanned image data of the respective frames which is stored in the prescan memory 91a and set them to the display image processing circuit 92. In addition, the stop value determination device 36a determines the stop values of the variable stop 36 for the respective frames.

As described above, the recording pixel region determination device of the CPU 76 calculates the input pixel region, the electronic variable ratio and the output image region in accordance with the type of the strip A, the print size of finished prints and the like and further calculates the recording image region and supplies the recording image region and the electronic variable ratio to the image processing unit 74.

When the image processing conditions of all the frames are set, the display image processing circuit 92 reads out the prescanned image data of the recording image regions of the respective frames from the prescan memory 91a, carries out the processing such as the degradation processing, electronic variable ratio processing, LPF processing, USM processing and the like in accordance with the set image processing conditions, further allocates and processes the prescanned image data of all the frames so that it is displayed on the display 18 and displays the prescanned images of a plurality of frames, for example, all the 24 frames on the display 18.

The operator carries out the necessary jobs such as the selection and indication of the frames to be output as the finished prints, the setting of the number of the prints to be output, the approval and the like while observing the display of the display 18 and further carries out the setting of the main subject, the color/density adjustment and the like when necessary. Note, when the setting of the main subject and the adjustment of the color/density are carried out, the image processing conditions determined by the CPU 98 are suitably corrected accordingly and the image processing conditions of the respective frames set to the display image processing circuit 92 are also corrected accordingly, whereby the display image on the display 18 is changed as described above.

The operator carries out the necessary adjustments and when the operator judges that all the indicated images are proper, he issues an output indication. At the same time, the image processing conditions of the respective frames to be output are finally determined.

When the output indication is issued, the frames whose output is indicated are main scanned. At the time, the image of the 24th frame of the strip A is located at the reading position Z of the film carrier 32. Therefore, the main scanning may be successively carried out after the strip A is returned so as to locate the image of the first frame at the reading position Z or in an indicated order. It is preferable, however, to successively transport the indicated frames to the reading position Z by transporting the strip A in the direction opposite to the prescanning direction (direction opposite to arrow x) from the 24th frame in consideration of the easiness of motion and a job efficiency.

When the output indication is issued as described above, the film carrier 32 transports the frames whose output is indicated, that is, when, for example, the output of the images of the 20th frame, the 12th frame and the 3rd frame is indicated, the film carrier 32 first transports the 20th frame to the reading position Z. The transport may be carried out by the operation of the operator in place of being automatically carried out by the film carrier 32.

When the film carrier 32 transports the 20th frame to the reading position Z, the G image, B image and R image of the frame are successively read by the scanner 12 in a manner similar to the above mentioned prescanning, supplied to the control section 14 and subjected to the signal processing by the signal processing unit 72 and thereafter stored to the main scan memory 91b of the frame memory 91.

In parallel with the above operation, the CPU 98 of the image processing unit 74 sets the finally determined image processing conditions of the 20th frame to the recording image processing circuit 94.

The recording image processing circuit 94 reads out the image data of the recording image region of the frame from the main scan memory 91b and subjects the image data to the predetermined image processing in accordance with the finally determined image processing conditions. Then the image is turned by 90 degrees by the image turning controller 82 and subjected to the negative/positive conversion by the positive/negative converter 84, when necessary. The image data in the output image region (the number of pixels) is output to the printer 16.

On the completion of the main scanning of the 20th frame, the film carrier 32 transports the strip A so that the 12th frame is located at the reading position Z next, the image of the 12th frame is read by the main scanning likewise, the image is processed by the recording image processing circuit 94 in accordance with the finally determined image processing conditions of the 12th frame and output to the printer 16 and thereafter the 3rd frame is main scanned and output likewise.

On the other hand, the printer 16 scans and exposes the light-sensitive material drawn from the magazine by the light beam which is modulated in accordance with the image data supplied from the recording image processing circuit 94 and deflected in the main scanning direction while transporting the light-sensitive material in the auxiliary scanning direction, to thereby form a latent image on the light-sensitive material.

The exposed light-sensitive material is developed by the development unit by being successively subjected to the color developing processing, the bleaching and fixing processing, and the wash processing, dried and made to respective finished prints by being cut off.

While the image forming apparatus of the present invention has been described above in detail, the invention is by no means limited to the above embodiment and it goes without saying that various design improvements and modifications can be made without departing from the spirit and scope of the invention.

As described above in detail, the image forming apparatus of the present invention is the digital image forming apparatus which can simply and promptly carry out the job for selecting the necessary frames from one strip and the approving job and realize high productivity at an excellent working efficiency.

What is claimed is:

1. A digital photoprinter, comprising:
   reading means for prescanning a plurality of original images and converting the original images to relatively low resolution digital image data;
   image processing means for subjecting the relatively low resolution digital image data to image processing conditions to create display image data;
   a display for displaying a plurality of images, of processed relatively low resolution display image data, at the same time;
   indication means for selecting images from the images displayed on the display; and
   a recording unit for receiving relatively high resolution digital image data corresponding to the images selected by said indication means and for outputting the relatively high resolution output digital image data of the selected images as photographic prints.

2. The digital photoprinter of claim 1, wherein said reading means carries out prescanning for obtaining the relatively low resolution digital image data used for display image data and main scanning for obtaining the relatively high resolution output digital image data to be supplied to said recording unit.

3. The digital photoprinter of claim 2, wherein at least one of reading conditions of said reading means and the image processing conditions for processing of the image data, for obtaining the output relatively high resolution digital image data, are set based upon the displayed images of the processed relatively low resolution digital image data.

4. The digital photoprinter of claim 3, wherein the images on said display are images processed in accordance with image processing conditions, and wherein the same image processing conditions are normally used to obtain the output relatively high resolution digital image data, the digital photoprinter further comprising, alteration means for altering at least one of the image processing conditions, reading conditions of said reading means, a number of photographic prints to be output by said recording unit and a size of the photographic prints to be output by said recording unit, after the images are displayed.

5. The digital photoprinter of claim 4, wherein main scanning is carried out, to generate the relatively high resolution images, by automatically and successively transporting only the selected original images for reading by the reading means, after display on said display.

6. The digital photoprinter of claim 3, wherein main scanning is carried out, to generate the relatively high resolution images, by automatically and successively transporting only the selected original images for reading by the reading means, after display on said display.

7. The digital photoprinter of claim 2, wherein the images displayed on said display are images processed in accordance with image processing conditions, and wherein the same image processing conditions are normally used to obtain the output relatively high resolution digital image data, the digital photoprinter further comprising, alteration means for altering at least one of the image processing conditions, reading conditions of said reading means, a number of photographic prints to be output by said recording unit and a size of the photographic prints to be output by said recording unit, after the images are displayed.

8. The digital photoprinter of claim 7, wherein main scanning is carried out, to generate the relatively high resolution images, by automatically and successively transporting only the selected original images for reading by the reading means, after display on said display.

9. The digital photoprinter of claim 2, wherein the main scanning is carried out, to generate the relatively high resolution images, by automatically and successively transporting only the selected original images for reading by the reading means, after display on said display.

10. The digital photoprinter of claim 1, wherein at least one of reading conditions of said reading means and the image processing conditions for processing of the image data, for obtaining the output relatively high resolution digital image data, are set based upon the displayed images of the processed relatively low resolution digital image data.

11. The digital photoprinter of claim 10, wherein the images displayed on said display are images processed in accordance with image processing conditions, and wherein the same image processing conditions are normally used to obtain the output relatively high resolution digital image data, the digital photoprinter further comprising, alteration means for altering at least one of the image processing conditions, reading conditions of said reading means, a number of photographic prints to be output by said recording unit and a size of the photographic prints to be output by said recording unit, after the images are displayed.

12. The digital photoprinter of claim 11, wherein main scanning is carried out, to generate the relatively high resolution images, by automatically and successively transporting only the selected original images for reading by the reading means, after display on said display.

13. The digital photoprinter of claim 10, wherein main scanning is carried out, to generate the relatively high resolution images, by automatically and successively transporting only the selected original images for reading by the reading means after display on said display.

14. The digital photoprinter of claim 1, wherein the images displayed on said display are images processed in accordance with image processing conditions, and wherein the same image processing conditions are normally used to obtain the output relatively high resolution digital image data, the digital photoprinter further comprising, alteration means for altering at least one of the image processing conditions, reading conditions of said reading means, a number of photographic prints to be output by said recording unit and a size of the photographic prints to be output by said recording unit, after the images are displayed.

15. The digital photoprinter of claim 14, wherein main scanning is carried out, to generate the relatively high resolution images, by automatically and successively transporting only the selected original images for reading by the reading means, after display on said display.

16. The digital photoprinter of claim 1, wherein main scanning is carried out, to generate the relatively high resolution images, by automatically and successively transporting only the selected original images for reading by the reading means, after display on said display.

17. The digital photoprinter of claim 16, wherein the selected original images are successively transported for main scanning reading in reverse order of original reading.

18. The digital photoprinter of claim 1, further comprising:

alteration means for altering the image processing conditions, after the images are displayed on said display.

19. The digital photoprinter of claim 1, wherein the relatively high resolution images are processed prior to being output, with the same image processing conditions as the relatively low resolution images displayed on said display.

20. The digital photoprinter of claim 1, further comprising alteration means for altering at least one of the image processing conditions, reading conditions of said reading means, a number of photographic prints to be output by said recording unit and size of the photographic prints to be output by said recording unit, after the images are displayed.

* * * * *